(12) United States Patent
Zaccá

(10) Patent No.: US 11,579,275 B2
(45) Date of Patent: Feb. 14, 2023

(54) ECHO BASED ROOM ESTIMATION

(71) Applicant: Bang & Olufsen A/S, Struer (DK)

(72) Inventor: Vincenzo Zaccá, Struer (DK)

(73) Assignee: Bang & Olufsen A/S, Struer (DK)

( * ) Notice: Subject to any disclaimer, the term of this patent is extended or adjusted under 35 U.S.C. 154(b) by 91 days.

(21) Appl. No.: 17/072,323

(22) Filed: Oct. 16, 2020

(65) Prior Publication Data

US 2021/0116555 A1  Apr. 22, 2021

(30) Foreign Application Priority Data

Oct. 17, 2019 (EP) .................................... 19203830

(51) Int. Cl.
*G01S 7/539* (2006.01)
*G01S 7/54* (2006.01)
*H04R 29/00* (2006.01)

(52) U.S. Cl.
CPC .............. *G01S 7/539* (2013.01); *G01S 7/54* (2013.01); *H04R 29/001* (2013.01)

(58) Field of Classification Search
CPC .......... G01S 7/539; G01S 7/54; H04R 29/001
USPC ........... 381/56, 66, 71.12, 71.1, 71.7, 71.14, 381/94.1, 94.2; 379/406.02, 406.09, 379/406.01, 406.11
See application file for complete search history.

(56) References Cited

U.S. PATENT DOCUMENTS

| | | | | |
|---|---|---|---|---|
| 4,109,107 A | * | 8/1978 | Boast | H04R 3/04 381/103 |
| 9,959,883 B2 | * | 5/2018 | Choueiri | G10L 21/0232 |
| 2007/0116298 A1 | * | 5/2007 | Holmi | H04R 5/02 381/86 |
| 2011/0317522 A1 | | 12/2011 | Florencio et al. | |
| 2015/0189431 A1 | * | 7/2015 | Lou | H04R 3/002 381/66 |

(Continued)

OTHER PUBLICATIONS

Fla Vio Ribeiro et al: "Geometrically Constrained Room Modeling With Compact Microphone Arrays", IEEE Transactions on Audio, Speech and Language Processing, IEEE, US, vol. 20, No. 5 Jul. 2012 pp. 1449-1460.

(Continued)

*Primary Examiner* — Vivian C Chin
*Assistant Examiner* — Con P Tran
(74) *Attorney, Agent, or Firm* — Harness, Dickey & Pierce, P.L.C.; Anthony Fussner

(57) ABSTRACT

A method for estimating an acoustic influence of walls of a room, comprising emitting a known excitation sound signal, receiving a set of measurement signals, each measurement signal being received by one microphone in a microphone array and each measurement signal including a set of echoes caused by reflections by the walls, solving a linear system of equations to identify locations of image source and estimating the acoustic influence based these image sources. The signal model includes a convolution of:

the excitation signal,
a multichannel filter (M) representing the relative delays of the microphones in the microphone array, the relative delays determined based on a known geometry of the microphone array, and
a directivity model v(n, p) of the driver(s) in the form of an anechoic far-field impulse response as a function of transmit angle.

20 Claims, 5 Drawing Sheets

(56) References Cited

U.S. PATENT DOCUMENTS

2017/0070840 A1* 3/2017 Kordon .................. H04S 7/307

OTHER PUBLICATIONS

Ivan Dokmanic et al; "Can one hear the shape of a room: the 2-D polygonal case", 2011 IEEE International Conference on Acoustics, Speech and Signal Processing: (ICASSP 2011); Prague, Czech Republic, May 22-27, 2011, IEEE, Piscataway NJ, May 22, 2011, pp. 321-324.

European Search Report for EP Application No. 19203830.5 that is the parent application to the instant application, dated Mar. 25, 2020, 9 pages.

* cited by examiner

ECHO BASED ROOM ESTIMATION

CROSS-REFERENCE TO RELATED APPLICATION

This patent U.S. patent application claims priority to and the benefit of European Application No. 19203830.5 filed Oct. 17, 2019. The entire content of this application is incorporated herein by reference.

FIELD OF THE INVENTION

The present invention relates to estimation of the influence of a room (and specifically the walls of the room) on an acoustic experience. The estimation is based on received echoes from transmitted sound signals.

BACKGROUND OF THE INVENTION

More advanced loudspeaker systems make it possible to control and personalize the listening experience by advanced sound control. Examples include personalized listening zones, sound field navigation, object-based audio, surround audio, echo-free teleconferencing, active room compensation, etc.

Many such audio control techniques require at least some prior knowledge of the acoustic properties of the surrounding space, e.g. the room and how they will influence the sound. For example, reflections caused by the walls of the room may significantly impact the listening experience. It is therefore desirable that a loudspeaker system (e.g. a hi-fi stereo system, a soundbar of a multimedia playback system, or a teleconferencing system) automatically can determine the loudspeakers' position in relation to at least some of the walls of the room, and how these walls will influence the sound.

Recently, intelligent loudspeakers that are equipped with inexpensive microphones have entered the consumer market. These systems usually consist of an enclosure with multiple loudspeaker drivers and a microphone array. With the microphone array, the system is capable of recognizing speech commands from users which has created a new interface between human and machine. It has been proposed to use such microphones to also determine the location of the room walls.

The general principle is that when a loudspeaker emits a sound signal into the room, it will be reflected (echoed) by the walls. The microphones will receive these echoes in the form of delayed versions of the transmitted signal (filtered by the loudspeaker, walls, and microphones). The direct path contribution (i.e. the emitted signal received directly by the microphones, without reflection from the walls) is typically known (since the relative position between loudspeaker and microphones is known and constant over time) and can therefore be eliminated. Distances to the walls can then be determined by estimating the precise delay of the echoes from the walls, and by using the relative delay between microphones in the array to determine angles.

In practice, such echo detection is rather challenging, as the echoes of the transmitted signal are concealed by the filtering of the loudspeaker, walls, and microphones.

A general approach to handling this challenge is provided in FIG. 1, where it is assumed that the source (loudspeaker) and receiver (microphone array) are synchronized and that the excitation signal (emitted signal) is known (but not necessarily predetermined).

First, in step 1, the known excitation signal is deconvolved from the received signal, to obtain an estimated channel. Then, in step 2, a loudspeaker model is used to remove the influence of the loudspeaker response on the channel estimate. The result is an estimation of the room impulse response. Next, in step 3, echoes are identified in the impulse response, and in step 4 the echoes are assigned to possible walls, and the location of the walls is determined using the known geometry of the microphone array. It is noted that the four steps are not necessarily performed as discrete steps.

There are various prior art examples following this general approach, but differing in setup and assumptions. Some useful assumptions (simplifications) are:
1. The emitted and received acoustic signals (sound fields) are modeled as "sound rays" which propagate in straight narrow lines and is reflected specularly by the walls.
2. The microphone array is compact with respect to the distance to the walls (i.e. array diameter«distance to walls). This allows plane wave assumption for all echoes.

As an example of prior art solutions, reference is made to US 2011/0317522, which generally follows the approach in FIG. 1, although some of the steps have been combined and handled jointly. Specifically, the excitation signal is deconvolved from the measurement signals before any estimation takes place. Although in principle any known excitation signal may be deconvolved from the measured signals, significant information will be lost unless the excitation signal complies with some rather strict requirements. Specifically, the excitation signal is preferably a wide band, non-periodic signal. In US 2011/0317522, a linear sine sweep from 30 Hz to 8 kHz is given as an example.

Further, the method in US 2011/0317522 performs step 3 in FIG. 1 by matching the measured signals with an empiric model based on a pre-stored dataset including a large number of measurements of reflections against a single wall in an anechoic chamber. Each such measurement represents a "single wall impulse response" (SWIR). As a reflection involves both loudspeaker (transmission), wall (reflection) and microphones (reception), the measurements and the resulting model will be specific to the actual setup used in the measurement. In other words, the measurements must be made using the same microphone array that will be used in the end product, and with a wall which has the same (or at least similar) properties as the walls of the room where the end product is used.

Another example of a prior art solution following a similar approach is provided by the article "Geometrically Constrained Room Modeling With Compact Microphone Array", but Ribeiro et al., IEEE Transactions on Audio, Speech and Language Processing, Vol. 20, No 5, July 2012. Also in this case, the model is based on wall impulse responses (WIR) which are collected in an anechoic chamber using a barrier as wall simulator (see page 1455, left col., middle). Further, and similar to US 2011/0317522, the excitation signal is deconvolved from the measurement signals before any estimation takes place. Specifically, on page 1452, left column, end of section A, it is stated that the room impulse response (RIR) is estimated from observations $y_m(n)$, given a persistent exciting signal $s(n)$. Again, therefore, the performance of the model will depend on the characteristics of the excitation signal.

It would be desirable to provide a more versatile approach, less restricted by the excitation signal and requiring a less demanding modelling process.

GENERAL DISCLOSURE OF THE INVENTION

This and other objects are achieved by method for estimating an acoustic influence of walls of a room, using a system including a loudspeaker including at least one acoustic driver, and a compact microphone array including a set of microphones arranged in a known geometry around the loudspeaker.

The method comprises emitting a known excitation sound signal, receiving a set of measurement signals, each measurement signal being received by one microphone in the microphone array and each measurement signal including a direct path component and a set of echoes, the echoes caused by reflections by the walls, defining a linear system of equations $y=\Phi h$, wherein y is the set of measurement signals, $\Phi$ is a signal model of the system, and h is a vector, each element of h representing a candidate location of an image source with a value representing a gain of the image source, identifying non-zero values of h by using least square estimation to minimize $|y-\Phi h|$, wherein the least-squares estimation is $\ell_1$-regularized in order to restrict the number of non-zero values of h, and estimating the acoustic influence based on image sources corresponding to the identified non-zero values of h. The signal model includes a convolution of:

- the excitation signal,
- a multichannel filter representing the relative delays of the microphones in the microphone array, the relative delays determined based on a known geometry of the microphone array, and
- a directivity model of the driver(s) in the form of an anechoic far-field impulse response as a function of transmit angle.

By "walls" is here intended any large, generally flat, vertical reflecting surface in the room. A person skilled in the art will realize that the method according to the invention may be generalized to also include reflections also from non-vertical surfaces, such as from the ceiling.

By "acoustic driver" is generally intended an electroacoustic driver, although other types of driver, capable of generating sound waves, are feasible.

A "compact" microphone array refers to an array having an maximum extension (maximum distance between two microphones) is significantly, e.g. 5 times, smaller than the distance from the microphone array to the walls.

Contrary to US 2011/0317522 and also to the approach in the article by Ribeiro et al, the excitation signal is included in the signal model. As a consequence, no "pre-processing" in the form of deconvolving the measurement signals with the excitation signal is required (step 1 in FIG. 1). This means that no information from the excitation signal is lost in an initial deconvolution step. As the present invention thus includes all available information, it becomes more robust.

Further, the relative delay of the microphones is analytically or numerically modeled by the multichannel filter, based on a known geometry of the microphone array. Such relative delays will not depend on the type of microphones (their frequency response) and this does therefore not need to be measured beforehand. The only information that needs to be empirically determined is the directivity of the loudspeaker driver(s), which is modeled by a series of far-field impulse responses measured in an anechoic environment.

In other words, the solution according to the present invention does not rely on measurements of wall impulse responses, which is done in US 2011/0317522 as well as in the article by Ribeiro et al. By avoiding to include microphones and a wall in the empiric model, the approach according to the invention will not be restricted to a specific microphone type nor to specific wall properties.

Preferably, the center of the microphone array is at, or close to, a point source representing the loudspeaker. In the case of several drivers, there is no single point source. In this case it is advantageous if all drivers (all point sources) are close to the center of the microphone with respect to the distance to the closest wall.

In principle, the geometry of the microphone array may be arbitrary, as long as the microphones are located in known positions. However, to simplify computations, it is advantageous if the array is symmetrical around the loudspeaker.

To detect vertical surfaces (walls) the loudspeaker and microphone array may preferably be arranged in one single plane, perpendicular to the walls. A rotationally symmetrical array in one plane is known as a uniform circular array (UCA).

If detection of non-vertical surfaces (e.g. ceiling and floor) is also intended, the microphone array should span a 3D space around the loudspeaker. In this case, a symmetrical array will have microphones located on the surface of a sphere with the loudspeaker in its center. Such an array is referred to as a uniform spherical array, The directivity model may be acquired by measuring a set of far-field impulse responses of the loudspeaker in an anechoic environment at a set of angular positions. Again, the type of microphone used to make the measurements is not critical for the measurement. Such measurements are relatively easy to perform. Preferably, but not necessarily, the angular positions measurements are uniformly distributed around the loudspeaker. The number of far-field responses may be larger than the number of microphones in the microphone array by a given factor, preferably an integer factor.

In a case where the loudspeaker includes several drivers, the directivity model may be a combined model, measured during simultaneous excitation of all drivers. Alternatively, an individual directivity submodel may be determined for each driver, and then superimposed.

A directivity model modelling each driver individually has the advantage that the estimation process may involve selectively exciting one or several drivers, and identifying walls for each such measurement.

In a preferred embodiment, the method includes eliminating a direct path contribution from each measurement signal, the direct path contribution being based on a known geometrical relationship between the loudspeaker and the respective microphone and representing the excitation signal received by each microphone without reflection from the walls.

Where the microphone array is a uniform circular array, the signal model is preferably evaluated for candidate image source locations placed in a polar grid and expressed in polar coordinates, in order to simplify calculations. Where the microphone array is a uniform spherical array, spherical coordinates may be used.

In these cases, the dimensions of variable h are advantageously expressed as radial and angular coordinates, and the convolution with the multichannel filter may be performed as a product of (two or three) convolutions, including a linear convolution over the radial coordinate, and a circular convolution over each angular coordinate.

BRIEF DESCRIPTION OF THE DRAWINGS

The present invention will be described in more detail with reference to the appended drawings, showing currently preferred embodiments of the invention.

DETAILED DESCRIPTION OF PREFERRED EMBODIMENTS

Systems and methods disclosed in the following may be implemented as software, firmware, hardware or a combination thereof. In a hardware implementation, the division of tasks does not necessarily correspond to the division into physical units; to the contrary, one physical component may have multiple functionalities, and one task may be carried out by several physical components in cooperation. Certain components or all components may be implemented as software executed by a digital signal processor or microprocessor, or be implemented as hardware or as an application-specific integrated circuit. Such software may be distributed on computer readable media, which may comprise computer storage media (or non-transitory media) and communication media (or transitory media). As is well known to a person skilled in the art, the term computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. Further, it is well known to the skilled person that communication media typically embodies computer readable instructions, data structures, program modules or other data in a modulated data signal such as a carrier wave or other transport mechanism and includes any information delivery media.

Figure 1:
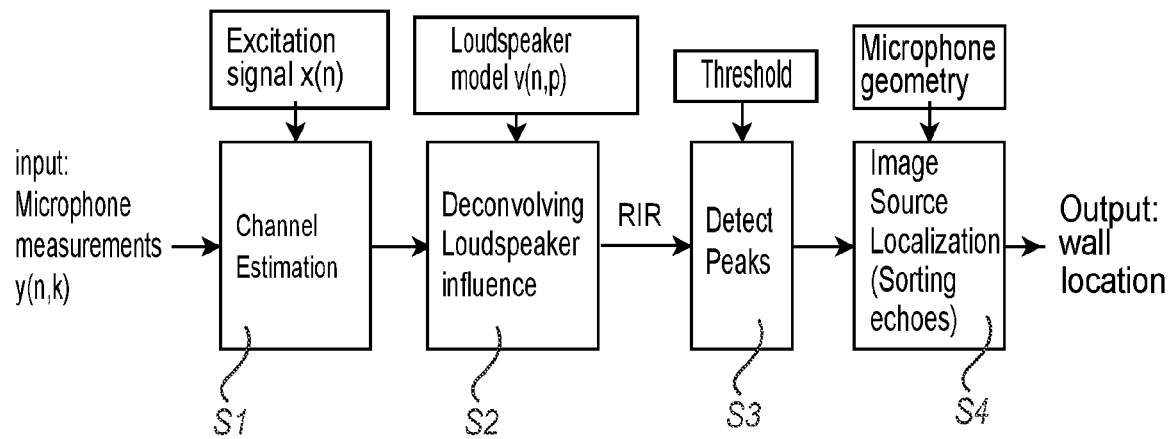
FIG. 1 is a block diagram of an approach for room estimation according to prior art.
Figure 2:
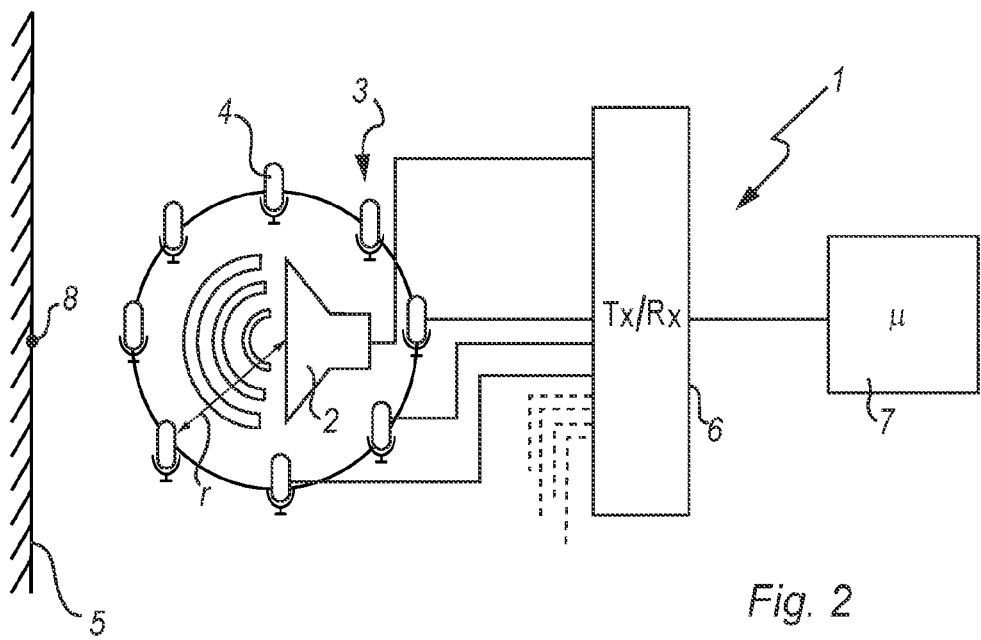
FIG. 2 is a top view of a system according to an embodiment of the invention.
Figure 3:
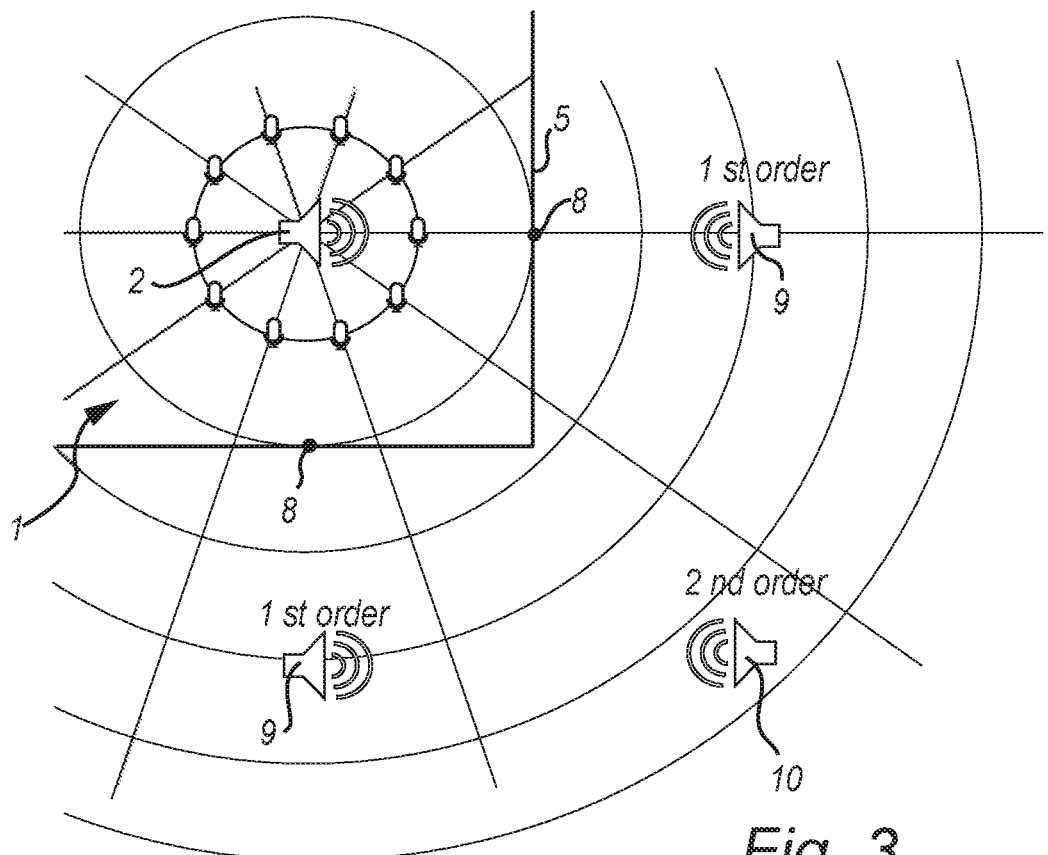
FIG. 3 shows the system in FIG. 1 and image sources representing first and second order reflections in a rectangular room.

System setup FIGS. 2-3 show a system 1 that has at least one loudspeaker 2 and a compact microphone array 3 with N microphones 4 arranged in a known geometry surrounding the loudspeaker 2. The system 1 is placed in a space, here a rectangular room with four walls 5. The array is compact, meaning that the extension r of the array is significantly, e.g. 5 times, smaller than the distance d to the surrounding walls 5 (r«d). (Note that the figures are not to scale, and exaggerate the size of the microphone array.)

In the illustrated case, the array 3 is a uniform circular array (UCA) with radius r, and the loudspeaker is placed in the center of the array. The plane of the array is perpendicular to the walls, i.e. horizontal in most cases. The illustrated geometry is not required for the general principle of the invention, but will simplify calculations. In particular, if also other surfaces, such as the ceiling, should be estimated, then the microphone array should preferably extend in 3D (i.e. not in one plane).

The system is connected to a transceiver 6, configured to transmit a transmit signal to the loudspeaker, and to receive return signals from the microphones 4 in the array 3. The transmitter and receiver sides of the transceiver 6 are synchronized and coincide geometrically. The transceiver 6 is connected to processing circuitry 7 configured to estimate the geometry of the room based on sound signals emitted by the loudspeaker 2 and reflected by the walls (and other flat surfaces) of the room.

The transceiver 6 is configured to actively probe the room by generating a known excitation signal x, which is applied to the loudspeaker 2 and emitted into the room. The acoustic waves emitted by the loudspeaker are here modeled as sound rays, which are specularly reflected in the walls of the room (and other surfaces). The loudspeaker 2 (and center of the microphone array 3) form the origin of a polar coordinate system, where θ=0 corresponds with the main emission direction of the loudspeaker 2. For first order reflections (i.e. sound rays emitted by the loudspeaker and reflected in the opposite direction) the wall is orthogonal to the sound ray in the reflection point 8. For practical purposes, it is here assumed that the wall extends linearly with similar acoustic characteristics.

Similar to optical reflections, a reflection from a wall can be regarded as a signal emitted from an "image source" located beyond the wall. In FIG. 3, two first order image sources 9 and one second order image sources 10 are illustrated. By determining the positions of these image sources, the position (distance and orientation) of the walls can be determined. Specifically, the distance to a wall is half the distance to a first order image source, and the surface of the wall is perpendicular to the direction of arrival (DOA) from that image source.

By identifying and locating the image sources in the room, the walls (and potentially other reflecting surfaces) may be identified. In the following, a signal model will be described, which provides a relationship between the image sources and the measured microphone signals. The forward model treats the image sources as input, and defines the microphone signals as the result of the system (input signal, loudspeaker, microphone array) acting on this input. The image sources are identified by solving the reverse problem, i.e. determining the image sources when the microphone signals are known.

Candidate Image Source Locations

In polar coordinates, an image source location is $\{R_s, \theta_s\}$, where $R_S$ is the distance and $\theta_S$ is the direction of arrival. In principle, an image source may be located anywhere in the room, and each coordinate is continuous. In order to facilitate solving the inverse problem, it is beneficial to discretize distance $R_S$ and angle $\theta_S$ and to define a grid of candidate locations. The general idea is to create a large dictionary of Rotated Image Source Impulse Responses (RISIR). The inverse problem is then solved by fitting a sparse number of these RISIR in the dictionary, with the microphone observations. Once the RISIR that are likely to be in the measured signal are estimated, they can be mapped back to wall locations.

The dictionary can be computed efficiently for candidate locations on a uniform polar grid. By exploiting the symmetry of the uniform circular array, the image source responses can be evaluated for many directions of arrival efficiently. As a consequence, instead of iterating over a set of $(R_i, \theta_i)$, an input signal h is defined. The length of h is equal to the number of discrete points on the grid, and h contains the gains for all candidate image sources. The index of the nonzero values in h will then correspond to image source locations, and the value of h in these locations will be the respective image source gain.

Consider the set $\mathcal{H}$ that contains the location of S first and second order virtual sources, that dominate the early part of the room impulse response. A signal model of the room influence that only accounts for these S reflections can be parameterized by S locations (in two dimensions) of the corresponding image sources.

In polar coordinates, the location of source s can be expressed as $r_s=[R,\theta]^T$, for $R\in[r,R_{max}]$ and $\theta\in[0,2\pi]$, where r as above is the radius of the compact uniform circular array, so that $\mathcal{H}=\{r_i\}_{i=0}^{S-1}$. The same information can also be expressed as a vector.

Figure 4:
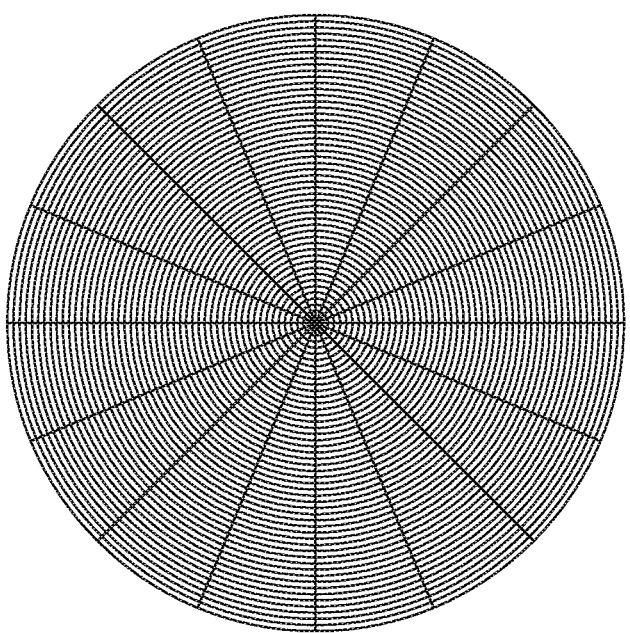
FIG. 4 shows discretization of image source locations in a polar coordinate model.
Figure 5:
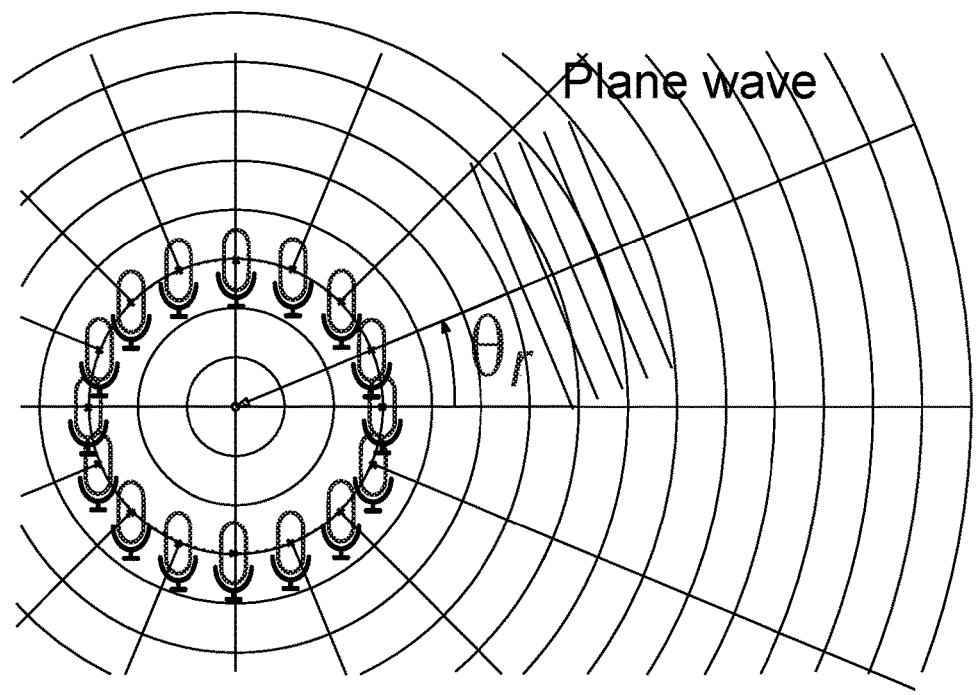
FIG. 5 shows a plane wave approaching a uniform circular microphone array.

If the microphone measurements y(n,k) and excitation signal x(n) have been sampled in time with $f_s$, then R can be discretized with steps of $\Delta R=c/f_s$. By dividing by the speed of sound, c, the total number of discrete steps is $T=R_{max}f_s/c$. The angle $\theta$ can be discretized in steps $2\pi/NP$, where N is the number of microphones and P is a natural number that determines an up-sampling factor (in order to have higher resolution than provided by the number of microphones). Thus we have a total of NPT candidate locations for which we can compute the measurement model. An example of a polar grid with NP=16 and T=50 is shown in FIG. 4.

The discrete signal h is now defined as containing all the NPT weights for each of these image sources. The representation of the set $\{H\}$ is mapped to a two dimensional discrete signal h(n, p), where n=0, ..., T−1 is proportional to the image source distance (and delay) and p=0, ..., NP−1 is proportional to the direction of arrival (DOA). As previously noted, the index of the nonzero values in h(n, p) correspond to the distance and DOA of the image sources.

$$h(n, p) = \sum_{r \in \mathcal{H}} \frac{1}{R} \delta\left(n - \left\lceil \frac{R}{R_{max}} T \right\rceil\right) \delta\left(p - \left\lceil \frac{\theta}{2\pi} NP \right\rceil\right) \quad \text{(Eq. 1)}$$

Since the measurement model is preferably expressed using matrix-vector products, it is convenient to define a vector containing the elements of h(n, p). This is defined as follows $$h_p = [h(0, p), h(1, p), \ldots, h(T-1, p)]^T \in \mathbb{R}^T$$

$$h = \begin{bmatrix} h_0 \\ h_1 \\ \vdots \\ h_{NP-1} \end{bmatrix} \in \mathbb{R}^{TNP}$$

The choice for stacking the p=0 responses first, rather than the n=0 is arbitrary. However, the equations in the present description follow this convention.

Observe the relationship between the number of image sources S and the vector h as $\|h\|_0=S$, where $\|\cdot\|_0$ denotes the $l_0$ norm. As mentioned above, for a rectangular room, the number of first and second order reflections is S=8. The input vector h is sparse, since in general we have that S«NPT.

Microphone Array Plane Wave Response

The plane wave response of a compact microphone array (array response) assumes that the source signal is in the far field. Therefore, the attenuation of the signal is approximately equal for all microphones in the array. The only difference between signals received by different microphones will be a relative delay determined by the array geometry. In general such relative delays $\Delta d_i(\theta)$ are only a function of direction of arrival $\theta$.

For a uniform circular array (like the array 3 in FIG. 2) the symmetry in $\theta$ can be exploited to compute the array response for many image sources on a uniform grid using Fast Fourier Transform.

Consider a uniform circular array (UCA) consisting of N microphones. The microphone locations are denoted by $\{r, \theta_m\}$ where $\theta_m=2\pi i/N$, i=0 ... N−1. This is illustrated in FIG. 3.

Consider now a single image source, whose location is $\{R_s, \theta_s\}$. The distance from each microphone to the source is then given by;

$$d(R_s, \theta_s, r, i) = \sqrt{R_s^2 + r^2 - 2R_s r \cos\left(\theta_s - \frac{2\pi i}{N}\right)} \quad \text{(Eq. 2)}$$

The distance d may also be expressed as $R_s+(\Delta d_i-r)$, where $\Delta d_i$ is the relative distance for microphone i, so that $\Delta d_i=d_i-R_s+r$. This $\Delta d_i$ will explain a plane-wave event on the microphone array, which will only depend on the direction of arrival from the source, $\theta_s$.

As the array is compact (source is in the far-field), we have Rs»r, and:

$$\lim_{R_s \to \infty} \Delta d(R_s, \theta_s, i) =$$

$$\lim_{R_s \to \infty} \sqrt{R_s^2 + r^2 - 2R_s r \cos\left(\theta_s - \frac{2\pi i}{N}\right)} - R_s + r = r\left(1 - \cos\left(\theta_s - \frac{2\pi i}{N}\right)\right)$$

By dividing by the speed of sound, c, the relative measured delays for a plane wave arriving from $\theta_s$ can be expressed as a function only of $\theta_s$:

$$\Delta \tau_i(\theta_s, r_i) = \frac{r}{c}\left(1 - \cos\left(\theta_s - \frac{2\pi i}{N}\right)\right) \quad \text{(Eq. 3)}$$

The maximum relative delay between two microphones is bounded by 2r/c. If the sampling rate is $f_s$, then the maximum length of a discrete finite impulse response filter that captures the differences in delay has $$W = \left\lceil \frac{2rf_s}{c} \right\rceil$$

taps.

The microphone measurements y(n, k) can be interpreted as a two dimensional sampled signal, where n samples in time and k samples in the microphone dimension. This microphone dimension is uniformly sampled. A closer look at Eq. 3 from the perspective of the j:th microphone sample, shows that this is only a function of the difference $$\theta_s - \frac{2\pi j}{N}.$$

Therefore, if we wish to use the convolution theorem, we must evaluate $\theta_s$ with uniform intervals. This creates a shift-invariant steering function that only depends on the difference between the i:th microphone and the source angle.

A template mask matrix M is now defined.

$$m_{n,p} = \begin{cases} 1 & \text{if } n = \left[f_s \frac{r}{c}\left(1 - \cos\left(\frac{2\pi p}{NP}\right)\right)\right] \forall n, p \\ 0 & \text{elsewhere} \end{cases} \quad \text{(Eq. 4)}$$

It is noted that although there are N microphones, the template mask may have a factor P higher resolution, making it possible to have NP candidate angle locations. A two-dimensional circular convolution with h and m, will now explain the plane wave for NP microphone channels.

As one can observe, the matrix M is essentially a delay and sum filter bank that is steered in $\theta_s$=0. However, by circularly permutating the columns of M it is possible to steer into NP directions (in uniform steps).

By using the far-field assumption, $\Delta\tau$ has been constructed in such a way that it is independent of source distance $R_S$. As a result, the two-dimensional convolution with M can be computed as the product of two convolutions. One convolution is delay (temporal translation) that is proportional to the source distance. The second convolution permutes the mask, such that any plane wave direction can be modeled.

Specifically, one can now write a circular convolution in the microphone index dimension and a linear convolution in the microphone time dimension as a product of two convolutions:

$$f(t_1, j) \triangleq \sum_{\alpha=0}^{NP-1} \sum_{d=0}^{T-1} h(d, \alpha) m_{t_1-d, [j-\alpha]_{mod\, NP}} \quad \text{(Eq. 5)}$$

Observe that f is now defined for NP microphone channels. In Eq. 5 there is a circular convolution in the discrete microphone index dimension j and a linear convolution in the microphone time dimension $t_1$. A physically motivated interpretation of this convolution is that it maps source directions of arrival to the microphone index dimension, which in our case is an uniform circular array. In other words it maps (source direction of arrival×source distance) on (microphone channel×time). FIG. 4 shows three examples of the mask M for different number of microphones.

Loudspeaker Modelling

A loudspeaker is (typically) an electroacoustic device that connects the realm of electronics with the world of sound. A loudspeaker can convert an electric signal into pressure changes in the air around it. Often of much interest for acousticians is the frequency response of a loudspeaker. The rule of thumb is that to reproduce music one needs the full auditory band of 20 Hz-20 kHz or even higher.

Measuring the loudspeaker impulse response can be done by placing the loudspeaker under test in an anechoic room. A wide band excitation signal is emitted and the response is measured with a microphone. The loudspeaker is assumed to be a linear time-invariant system, whose impulse response is causal and finite. The estimate is computed by deconvolving the excitation signal from the microphone measurements. The deconvolution may be computed by taking the inverse of a Toeplitz matrix.

When attempting to localize reflections (image sources), using a loudspeaker model is useful for predicting the contribution of a reflector at a particular location, on the measured microphone signal. The more precise the loudspeaker model, the better is the prediction and thus the inverse problem of estimating the locations given measurements are also improved. One straightforward model is a measured loudspeaker impulse response. However, a loudspeaker impulse response is not constant in each transmitted direction. Indeed, it has been shown that the magnitude frequency response bandwidth is maximum directly in front of the loudspeaker cone, and is reduced at the back of the loudspeaker. Put differently, wide angular sound coverage (off-axis response) is reduced at the back, since high frequency sound tends to leave the speaker in narrow beams Based on this, the loudspeaker impulse response $v(n)$ is a function of listening position $v(n, r)$, in other words of the direction of transmission and distance. Furthermore, by our own construction, the loudspeaker response $v(n)$ does not include the propagation delay. Therefore, if the distance is sufficiently large, such that the far-field assumption holds, the loudspeaker can be modelled as a function of only the direction of transmission. It should be noted that the far-field distance is proportional to the wavelength. As a result, in broadband scenarios, the far-field assumption may not hold for the lower frequencies. Therefore, if the far-field can be considered to start at distance $r_0$ it is sufficient to model the loudspeaker impulse response at any position in the room further away than $r_0$.

Here, the loudspeaker model is given by a two dimensional $v(n, p)$, for n=0, . . . , K−1 and p=0, . . . , NP−1, where K is the length (number of time samples) of each impulse response, and NP is the number of uniform directions of transmission (NP is an integer which will be explained below). The model $v(n, p)$ is determined by a series of NP measurements (one for each angle of transmission) in an anechoic chamber, wherein the emitted excitation signal is deconvolved from the measured signals. The microphone that picks up the measurement signals is placed at a sufficient distance so as to ensure far-field conditions.

Complete Signal Model Φ

By combining the conclusions above, a complete linear measurement model can be formulated which maps an input signal representing the image sources to microphone measurements:

$$y(i, j) = \sum_{t_1=0}^{L-1} x(i - t_1) \left[ a^{dp}(t_1) + \sum_{\alpha=0}^{NP-1} \sum_{d=0}^{T-1} m(t_1 - d, [jP - \alpha]_{mod\, NP}) \sum_{t_2=0}^{K-1} v(d - t_2, \alpha) h(t_2, \alpha) \right] \quad \text{(Eq. 6)}$$

where:

y(n, k) is the microphone measurements h(n, p) is the discrete input signal, i.e. potential image sources locations. The values of h are image source gain. The locations of the identified image sources are indicated by the indices of nonzero entries of h(n, p). As mentioned above, the knowledge that there are few non-zero values of h is used when solving the inverse problem.

v(u, s) is the loudspeaker directivity model described above.

m(t, n) is the microphone array plane wave response as described above.

x(t) is the known excitation signal, and $a^{dp}$ is the impulse response of the direct path between the loudspeaker and microphone j.

It is noted that x, $a^{dp}$, m(t, n) and v(u, s) are all constant.

The model above performs a two dimensional convolution on input signal h(n, p). In particular since the first dimension of h denotes the distance $R_S$, convolving in the time dimension will alter the delay of the rotated image source response. Secondly, a circular convolution in the second dimension of h, will permuted the microphone channels, such that any plane wave arriving from $$\theta_r = \frac{2\pi i}{NP}$$

can be modeled.

Figure 6:
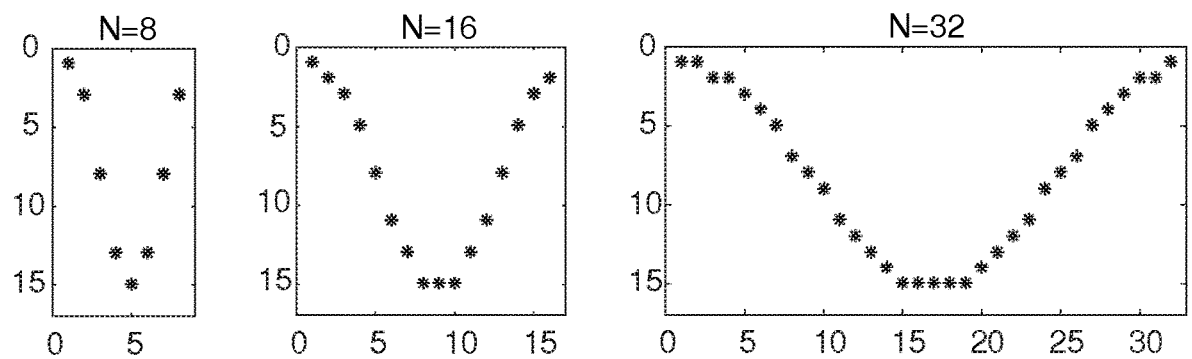
FIG. 6 shows examples of plane wave microphone array responses.
Figure 7A:
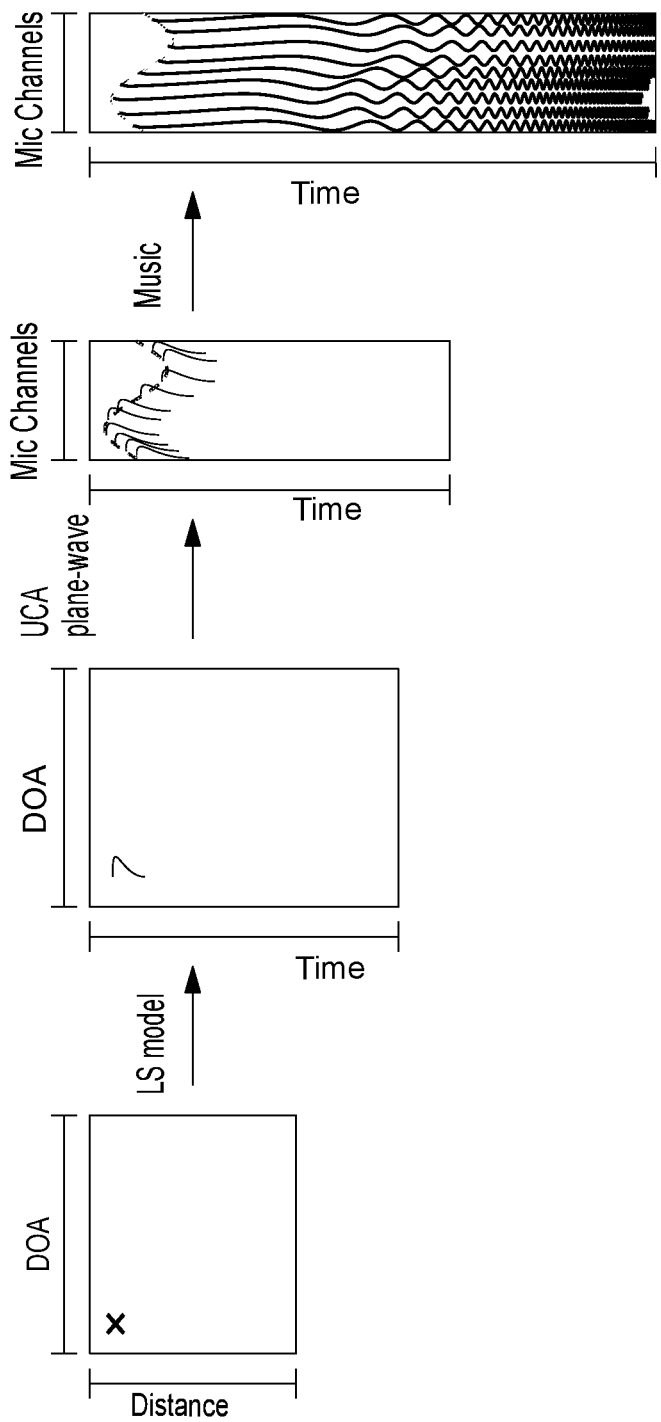
FIGS. 7a and 7b shows a complete signal model for two examples directions of arrival.
Figure 7B:
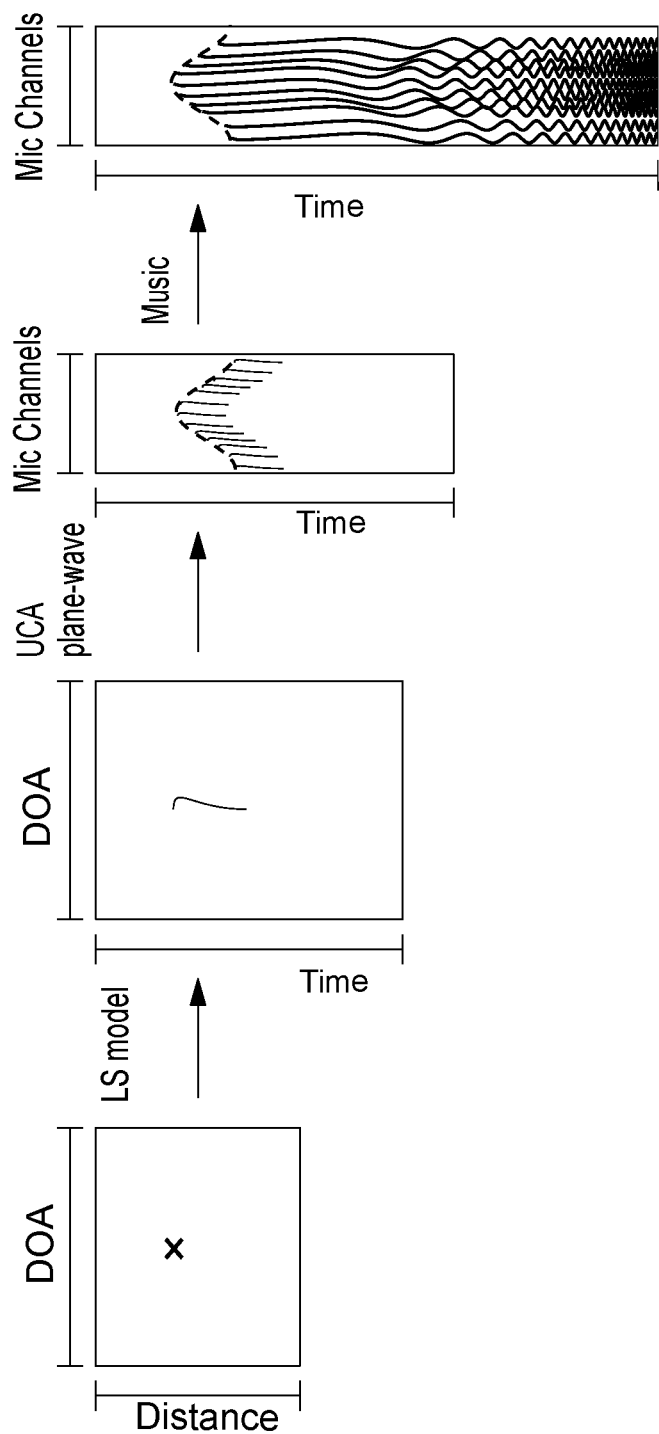

FIGS. 6a-b show modelling of a single image source. As one can see, the channel is composed in three sequential steps: The loudspeaker impulse response is added, the microphone plane wave response is added and finally (not shown in the figure) the direct path is added and is convolved with x(n). The key observations are that i) as the candidate location moves further away from the system, the signal is translated in the time dimension and ii) if the source circles around the system then the loudspeaker impulse response changes and the array template mask permutes circularly.

Solving the Problem

It can be shown that the signal model can be reformulated in terms of matrix-vector multiplication:

$$y = \Phi h$$

where, as above, y denotes the N microphone measurements, h denotes the gains generated by all possible image sources in a room, and $\Phi$ is a matrix corresponding to the convolutions in Eq. 6.

The least square estimate of h can be found by minimizing $|y-\Phi h|^2$. Typically, this will be numerically challenging, considering the potentially large number of solutions. However, if it can be assumed that the vector h is sparse, i.e. that there are very few image sources, the problem will be simplified:

$$\underset{h}{\text{minimize}} \quad \|y - \Phi h\|_2^2 \qquad \text{(Eq. 7)}$$
$$\text{subject to} \quad \|h\|_0 \leq S.$$

where S is the maximum number of expected image sources.

As mentioned above, considering only vertical walls in a shoe-box shaped room, there will only be (at most) eight first and second order image sources, and in this simple case h will thus have only have eight (or fewer) non-zero elements (S=8).

Unfortunately, solving eq. 7 leads to a non-convex optimization problem. In order to overcome this, the problem is relaxed to the $\ell_1$ norm, and the estimator $\hat{h}_{sparse}$ can be found by solving:

$$\underset{h}{\text{minimize}} \quad \|y - \Phi h\|_2^2 \qquad \text{(Eq. 8)}$$
$$\text{subject to} \quad \|h\|_1 \leq \beta.$$

It should be noted that eq. 8 is in the standard Lasso formulation. However, most solvers consider the so-called Lagrangian form:

$$\hat{h}_{sparse} = \underset{h}{\text{argmin}} \|y - \Phi h\|_2 + \lambda \|h\|_1. \qquad \text{(Eq. 9)}$$

where the exact relationship between $\lambda$ and $\beta$ is data dependent.

The standard Lasso problem works well when the received echo power from each wall of interest is approximately equal. However, if the loudspeaker is placed in a corner of the room, it is expected that the close echoes have higher power compared to the distant echoes. This is accounted for in the signal model by the gains in h. A second problem is that, for many loudspeakers, the total loudspeaker impulse response energy varies with the angle of transmission. This influences the signal to noise ratio of the detection problem. It is expected that an echo from a nearby wall, in the on-axis direction of the loudspeaker has a much higher influence on the microphone measurements compared to a wall facing the back of the loudspeaker that is placed further away.

The expected value for h is thus dependent on the distance of the wall and the DOA and the energy in y decays over time. Both influences can be compensated for by having a weighted least squared and a weighted $\ell_1$ norm. Let $\Lambda_{ls}$ denote a diagonal weighting matrix for the total least squares and let $\Lambda_h$ denote a diagonal weighting matrix for the gain on the candidate locations. The general optimization problem is then given by:

$$\hat{h}_{sparse} = \underset{h}{\text{argmin}} \left( y - \Phi h \right)^\dagger \Lambda_{ls} (y - \Phi h) + \|\Lambda_h h\|_1, \qquad \text{Eq. 10}$$

where † is the Hermitian operator. After solving, the non-zero elements of $\hat{h}_{sparse}$ will be the gain of image sources, and the indices of these elements will represent the locations of these image sources.

As explained above, determining the distance to and orientation of the walls is trivial based on the image source locations.

In its broadest form, the present invention relates to a method for estimating an acoustic influence of walls of a room, comprising emitting a known excitation sound signal, receiving a set of measurement signals, each measurement signal being received by one microphone in a microphone array and each measurement signal including a set of echoes caused by reflections by the walls, solving a linear system of equations to identify locations of image source and estimating the acoustic influence based these image sources. The signal model includes a convolution of:

the excitation signal,
a multichannel filter (M) representing the relative delays of the microphones in the microphone array, the relative delays determined based on a known geometry of the microphone array, and
a directivity model v(n, p) of the driver(s) in the form of an anechoic far-field impulse response as a function of transmit angle.

The person skilled in the art realizes that the present invention by no means is limited to the preferred embodiments described above. On the contrary, many modifications and variations are possible within the scope of the appended claims. For example, the details of the components in the system may vary.

What is claimed is:

1. A method for estimating an acoustic influence of walls of a room, using a system (1) including:
   a loudspeaker (2) including at least one acoustic driver, and
   a compact microphone array (3) including a set of microphones (4) arranged in a known geometry around the loudspeaker,
the method comprising:
   emitting a known excitation sound signal,
   receiving a set of measurement signals, the each measurement signal being received by one microphone in the microphone array and the each measurement signal including a direct path component and a set of echoes, said echoes caused by reflections by said walls,
   defining a linear system of equations y=Φh, wherein y is the set of measurement signals, Φ is a signal model of the system, and h is a vector, each element of h representing a candidate location of an image source with a value representing a gain of said image source,
   identifying non-zero values of h by using least square estimation to minimize |y−Φh|, wherein the least-squares estimation is $l_1$-regularized in order to restrict the number of non-zero values of h, and
   estimating the acoustic influence based on image sources corresponding to said identified non-zero values of h,
   characterized in that said signal model includes a convolution of:
     the known excitation signal (x),
     a multichannel filter (M) representing the relative delays of the microphones in the microphone array, said relative delays determined based on a known geometry of the microphone array, and
     a directivity model of the at least one acoustic driver in the form of an anechoic far-field impulse response of the at least one acoustic driver as a function of transmit angle, wherein the anechoic far-field impulse response of the at least one acoustic driver is measured in an anechoic environment using at least one measurement microphone arranged in the far-field of the at least one acoustic driver.

2. The method according to claim 1, wherein said directivity model is acquired by measuring a set of far-field impulse responses of the loudspeaker in an anechoic environment at a set of angular positions.

3. The method according to claim 2, wherein said angular positions are uniformly distributed.

4. The method according to claim 2, wherein said set of far-field impulse responses includes NP angular positions in said plane.

5. The method according to claim 2, wherein the loudspeaker has more than one acoustic driver, and wherein said directivity model is acquired by activating all the acoustic drivers simultaneously.

6. The method according to claim 2, wherein the loudspeaker has more than one acoustic driver, and wherein said directivity model includes several submodels, each acquired by activating one acoustic driver at a time.

7. The method according to claim 1, further comprising eliminating a direct path contribution from the each measurement signal, said direct path contribution being based on a known geometrical relationship between the loudspeaker and the respective microphone and representing the known excitation signal received by each microphone without reflection from the walls.

8. The method according to claim 1, wherein the microphone array is symmetrical around the loudspeaker.

9. The method according to claim 8, wherein the microphone array is a uniform spherical array.

10. The method according to claim 9, wherein the signal model is evaluated for candidate image source locations placed in a spherical grid, said locations expressed in spherical coordinates including a radial coordinate and two angular coordinates.

11. The method according to claim 10, wherein the dimensions of h represent radial and angular coordinates.

12. The method according to claim 10, wherein the convolution with the multichannel filter is performed as a product of convolutions, including a linear convolution over the radial coordinate, and a circular convolution over each angular coordinate.

13. The method according to claim 1, wherein the loudspeaker and the microphone array are arranged in a single plane, substantially perpendicular to the vertical walls of the room.

14. The method according to claim 13, wherein the microphone array is a uniform circular array.

15. The method according to claim 14, wherein the signal model is evaluated for candidate image source locations placed in a polar grid in said plane, said locations expressed in polar coordinates including a radial coordinate and an angular coordinate.

16. The method according to claim 1, wherein the known excitation signal is an exponential sine sweep.

17. A method for estimating an acoustic influence of walls of a room, using a system (1) including:
   a loudspeaker (2) including at least one acoustic driver, and
   a compact microphone array (3) including a set of microphones (4) arranged in a known geometry around the loudspeaker,
the method comprising:
   emitting a known excitation sound signal,
   receiving a set of measurement signals, the each measurement signal being received by one microphone in the microphone array and the each measurement signal including a direct path component and a set of echoes, said echoes caused by reflections by said walls,
   defining a linear system of equations y=Φh, wherein y is the set of measurement signals, Φ is a signal model of the system, and h is a vector, each element of h representing a candidate location of an image source with a value representing a gain of said image source,
   identifying non-zero values of h by using least square estimation to minimize |y−Φh| wherein the least-squares estimation is $l_1$-regularized in order to restrict the number of non-zero values of h, and
   estimating the acoustic influence based on image sources corresponding to said identified non-zero values of h,
   characterized in that said signal model includes a convolution of:
     the known excitation signal (x),
     a multichannel filter (M) representing the relative delays of the microphones in the microphone array, said relative delays determined based on a known geometry of the microphone array, and
     a directivity model of the at least one acoustic driver in the form of an anechoic far-field impulse response as a function of transmit angle;

wherein the loudspeaker and the microphone array are arranged in a single plane, substantially perpendicular to the vertical walls of the room;

wherein the microphone array is a uniform circular array; and wherein the signal model is evaluated for candidate image source locations placed in a polar grid in said plane, said locations expressed in polar coordinates including a radial coordinate and an angular coordinate.

18. The method according to claim 17, wherein the dimensions of h represent radial and angular coordinates.

19. The method according to claim 17, wherein the convolution with the multichannel filter is performed as a product of convolutions, including a linear convolution over the radial coordinate, and a circular convolution over the angular coordinate.

20. A method for estimating an acoustic influence of walls of a room, using a system (1) including:

a loudspeaker (2) including at least one acoustic driver, and a compact microphone array (3) including a set of microphones (4) arranged in a known geometry around the loudspeaker, the method comprising:

emitting a known excitation sound signal, receiving a set of measurement signals, the each measurement signal being received by one microphone in the microphone array and the each measurement signal including a direct path component and a set of echoes, said echoes caused by reflections by said walls, defining a linear system of equations y=Φh, wherein y is the set of measurement signals, Φ is a signal model of the system, and h is a vector, each element of h representing a candidate location of an image source with a value representing a gain of said image source, identifying non-zero values of h by using least square estimation to minimize |y−Φh| wherein the least-squares estimation is $l_1$-regularized in order to restrict the number of non-zero values of h, and estimating the acoustic influence based on image sources corresponding to said identified non-zero values of h, characterized in that said signal model includes a convolution of:

the known excitation signal (x), a multichannel filter (M) representing the relative delays of the microphones in the microphone array, said relative delays determined based on a known geometry of the microphone array, and a directivity model of the at least one acoustic driver in the form of an anechoic far-field impulse response as a function of transmit angle;

wherein the microphone array is symmetrical around the loudspeaker;

wherein the microphone array is a uniform spherical array;

wherein the signal model is evaluated for candidate image source locations placed in a spherical grid, said locations expressed in spherical coordinates including a radial coordinate and two angular coordinates; and wherein the convolution with the multichannel filter is performed as a product of convolutions, including a linear convolution over the radial coordinate, and a circular convolution over each angular coordinate.

\* \* \* \* \*